(12) United States Patent
Bergmeier et al.

(10) Patent No.: US 9,326,442 B1
(45) Date of Patent: May 3, 2016

(54) SIDE MOUNTED FERTILIZER KNIFE ASSEMBLY WITH INTERCHANGEABLE STRIP TILL AND LOW DRAFT POINTS

(75) Inventors: Mike J. Bergmeier, Hutchinson, KS (US); Stephen B. Albright, Inman, KS (US)

(73) Assignee: Shield Industries, Inc., Hutchinson, KS (US)

( * ) Notice: Subject to any disclaimer, the term of this patent is extended or adjusted under 35 U.S.C. 154(b) by 768 days.

(21) Appl. No.: 13/367,969

(22) Filed: Feb. 7, 2012

Related U.S. Application Data

(60) Provisional application No. 61/440,114, filed on Feb. 7, 2011.

(51) Int. Cl.
*A01C 23/02* (2006.01)
*A01C 5/06* (2006.01)

(52) U.S. Cl.
CPC ............. *A01C 23/025* (2013.01); *A01C 5/062* (2013.01)

(58) Field of Classification Search
CPC ............ A01C 7/02; A01C 7/023; A01C 7/06; A01C 23/025; A01C 5/062; A01B 13/08; A01M 17/002
USPC .................. 111/118–120, 123–126; 172/681, 172/684.5, 685, 690, 699–701, 705–711, 172/713, 721–733, 762, 776
See application file for complete search history.

(56) References Cited

U.S. PATENT DOCUMENTS

| | | |
|---|---|---|
| 2,148,925 A | 2/1939 | Bochy |
| 2,598,121 A | 5/1952 | Hannibal |
| 2,619,054 A | 11/1952 | Bell |
| 2,684,617 A | 7/1954 | Johnston |
| 2,689,514 A | 9/1954 | Ferguson |
| 2,716,823 A | 9/1955 | Mullin |
| 2,734,439 A | 2/1956 | Padrick |
| 2,768,591 A | 10/1956 | James |
| 2,842,077 A | 7/1958 | Morrison |
| 2,849,969 A | 9/1958 | Taylor |
| 2,874,656 A | 2/1959 | Bennett |
| 2,904,119 A | 9/1959 | Hunter |
| 2,924,187 A | 2/1960 | Zimmerman |

(Continued)

FOREIGN PATENT DOCUMENTS

| | | |
|---|---|---|
| AU | 217205 | 3/1957 |
| CA | 496012 | 9/1953 |

(Continued)

OTHER PUBLICATIONS

CA 2,208,106 A1; Yeager; Quick Change Mounted Knife; Dec. 18, 1998.*

*Primary Examiner* — Alicia Torres

(57) ABSTRACT

An improved fertilizer knife assembly includes a shank member for attaching to the machine shank of a fertilizer implement, a point member and a fertilizer tube. The point member has side flange portions that extend past the back surface of the shank member to provide a channel for receiving and protecting the lower end of the fertilizer tube. The point member is removably mounted to the shank member and is configured as one of two distinctive types of point members: a strip-till point member and a low-draft point member. Accordingly, a fertilizer implement with improved fertilizer knife assemblies may be reconfigured for either strip-till or low-draft cultivation with only a few minutes of effort.

3 Claims, 8 Drawing Sheets

(56) References Cited

U.S. PATENT DOCUMENTS

| | | | |
|---|---|---|---|
| 3,002,574 A | 10/1961 | Padrick | |
| 3,092,052 A | 6/1963 | Anderson | |
| 3,177,830 A | 4/1965 | Zimmerman | |
| 3,188,988 A | 6/1965 | Peck | |
| 3,259,087 A | 7/1966 | Horton | |
| 3,289,772 A | 12/1966 | Blackwood | |
| 3,296,985 A | 1/1967 | Shelton | |
| 3,439,636 A * | 4/1969 | Lemke | 111/123 |
| 3,517,752 A | 6/1970 | Glee | |
| 3,618,538 A | 11/1971 | Brannan | |
| 3,919,951 A | 11/1975 | Williams | |
| 3,970,445 A | 7/1976 | Gale et al. | |
| 4,033,271 A | 7/1977 | Williams et al. | |
| 4,132,181 A | 1/1979 | Smith | |
| 4,201,142 A | 5/1980 | Stump | |
| 4,269,274 A | 5/1981 | Robertson et al. | |
| 4,333,536 A | 6/1982 | Ryan | |
| 4,355,589 A | 10/1982 | Wetmore | |
| 4,446,927 A | 5/1984 | Robertson | |
| 4,592,294 A | 6/1986 | Dietrich et al. | |
| 4,616,580 A | 10/1986 | Moore et al. | |
| 4,628,839 A | 12/1986 | Edmisson | |
| 4,638,748 A | 1/1987 | Kopecky | |
| 4,719,862 A | 1/1988 | Edmisson | |
| 4,773,340 A | 9/1988 | Williams et al. | |
| 4,834,189 A | 5/1989 | Peterson et al. | |
| 4,869,328 A | 9/1989 | Carroll | |
| 5,310,009 A | 5/1994 | Rowlett | |
| 5,314,029 A | 5/1994 | Rowlett | |
| 5,452,673 A | 9/1995 | Bruce | |
| 5,460,106 A * | 10/1995 | Crockett et al. | 111/127 |
| 5,787,994 A | 8/1998 | Friesen | |
| 6,167,821 B1 | 1/2001 | Beggs | |
| 6,318,279 B1 | 11/2001 | Rowlett et al. | |
| 6,382,114 B1 | 5/2002 | Lanpher | |
| 6,397,767 B1 | 6/2002 | Dietrich, Sr. | |
| 6,405,665 B1 | 6/2002 | Henry et al. | |
| 6,745,709 B2 | 6/2004 | Rowlett et al. | |
| 6,871,709 B2 | 3/2005 | Knobloch et al. | |
| 6,955,131 B2 | 10/2005 | Beaujot et al. | |
| 6,973,884 B2 | 12/2005 | Dietrich, Sr. | |
| 7,568,439 B2 | 8/2009 | Steinlage et al. | |
| 8,161,984 B2 * | 4/2012 | Kholodenko et al. | 134/100.1 |
| 2009/0120340 A1 * | 5/2009 | Steinlage et al. | 111/123 |

FOREIGN PATENT DOCUMENTS

| | | |
|---|---|---|
| CA | 945183 | 4/1974 |
| DE | 552793 | 11/1930 |
| DE | 35151 | 1/1965 |
| FR | 657738 | 5/1929 |
| FR | 904577 | 11/1945 |
| GB | 677874 | 8/1952 |
| GB | 1141320 | 1/1969 |
| NL | 7409495 | 7/1974 |

* cited by examiner

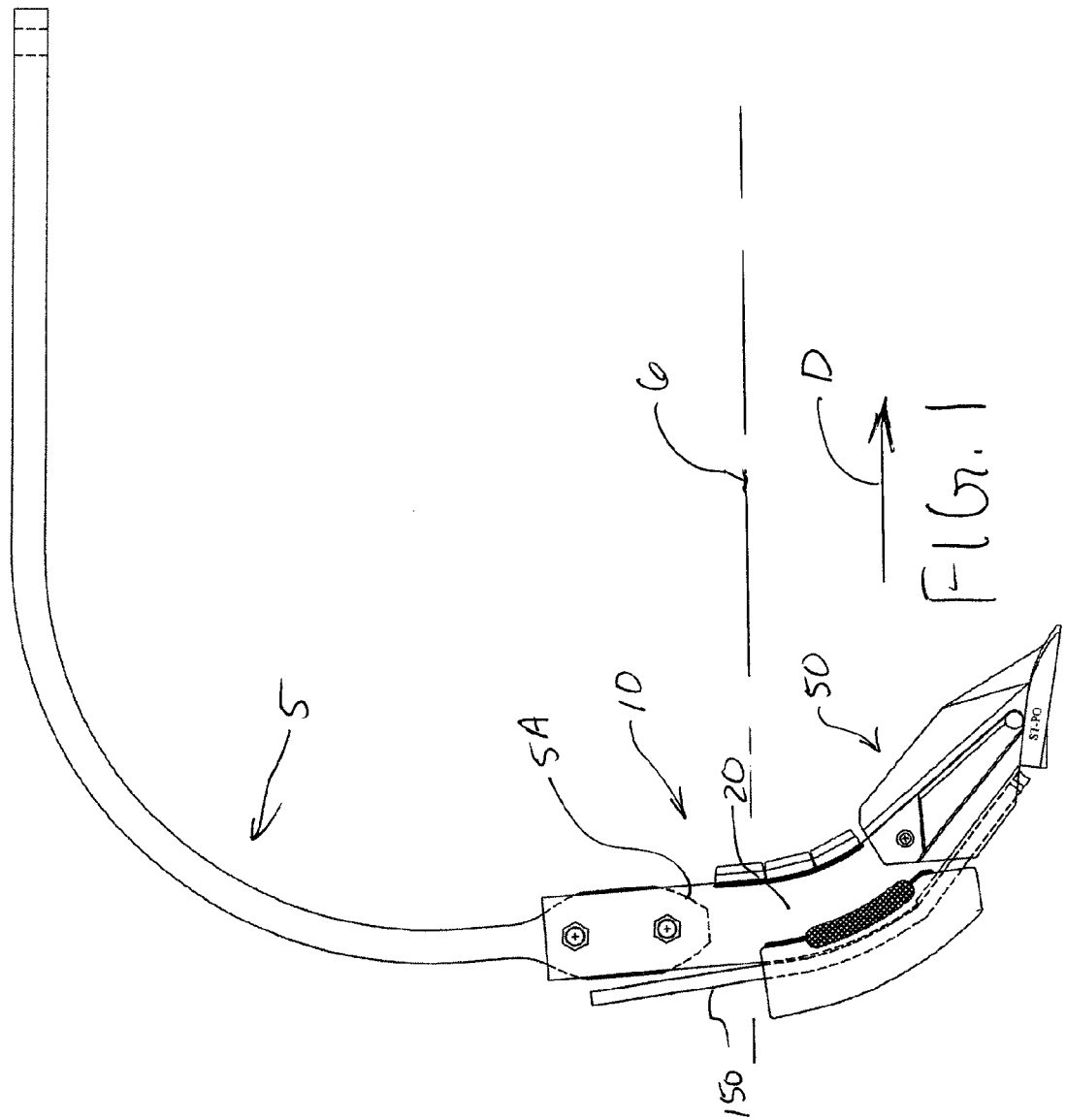

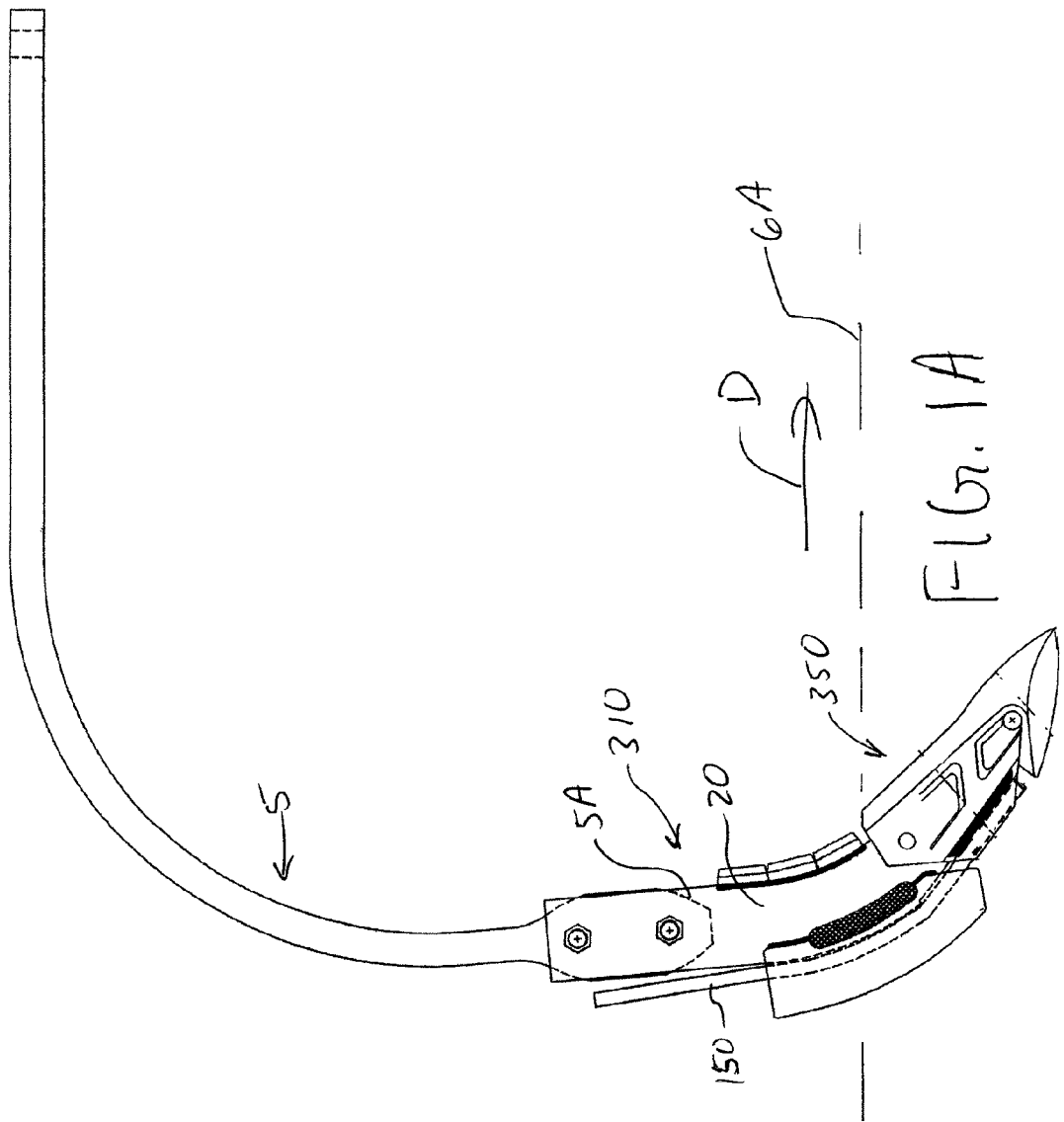

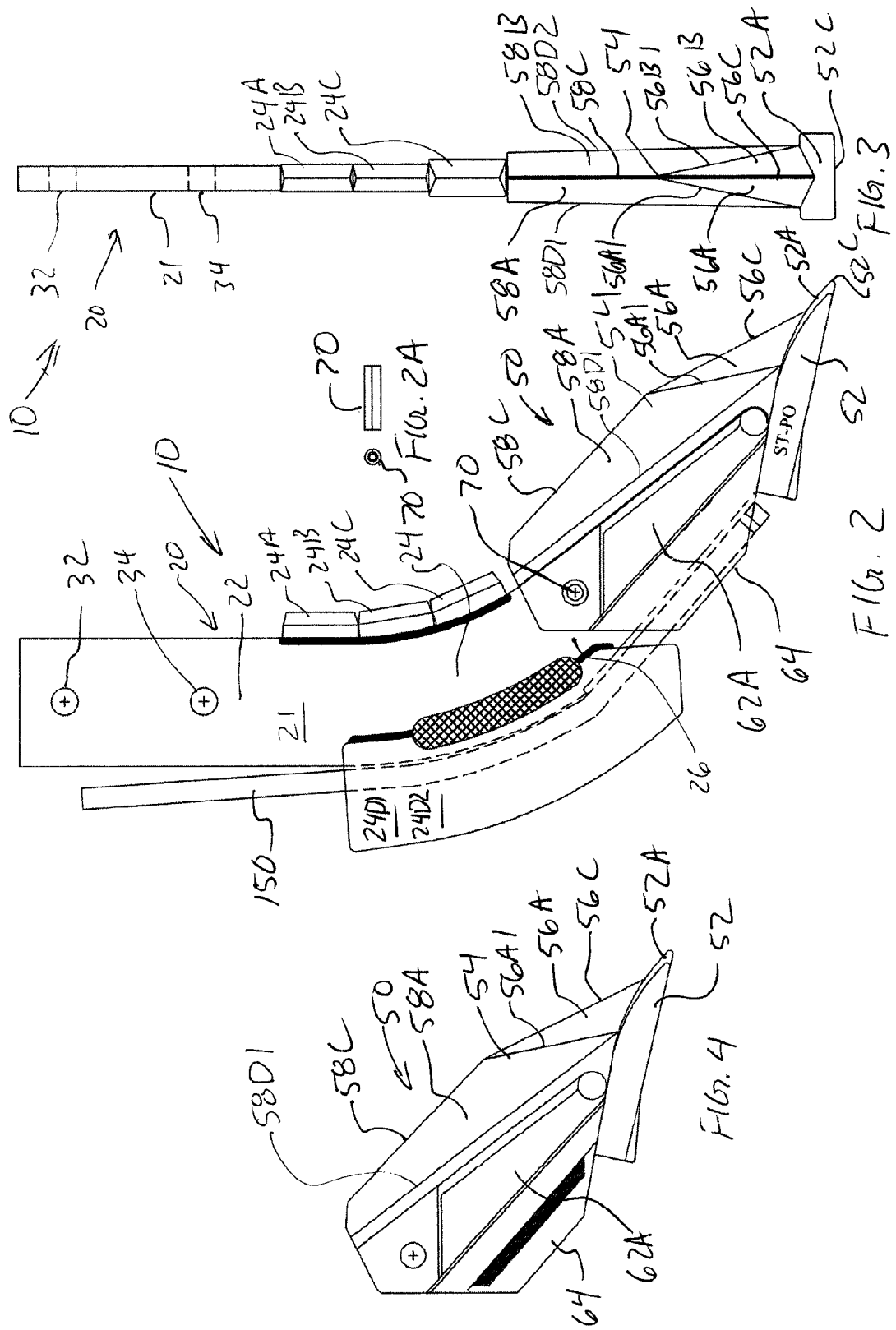

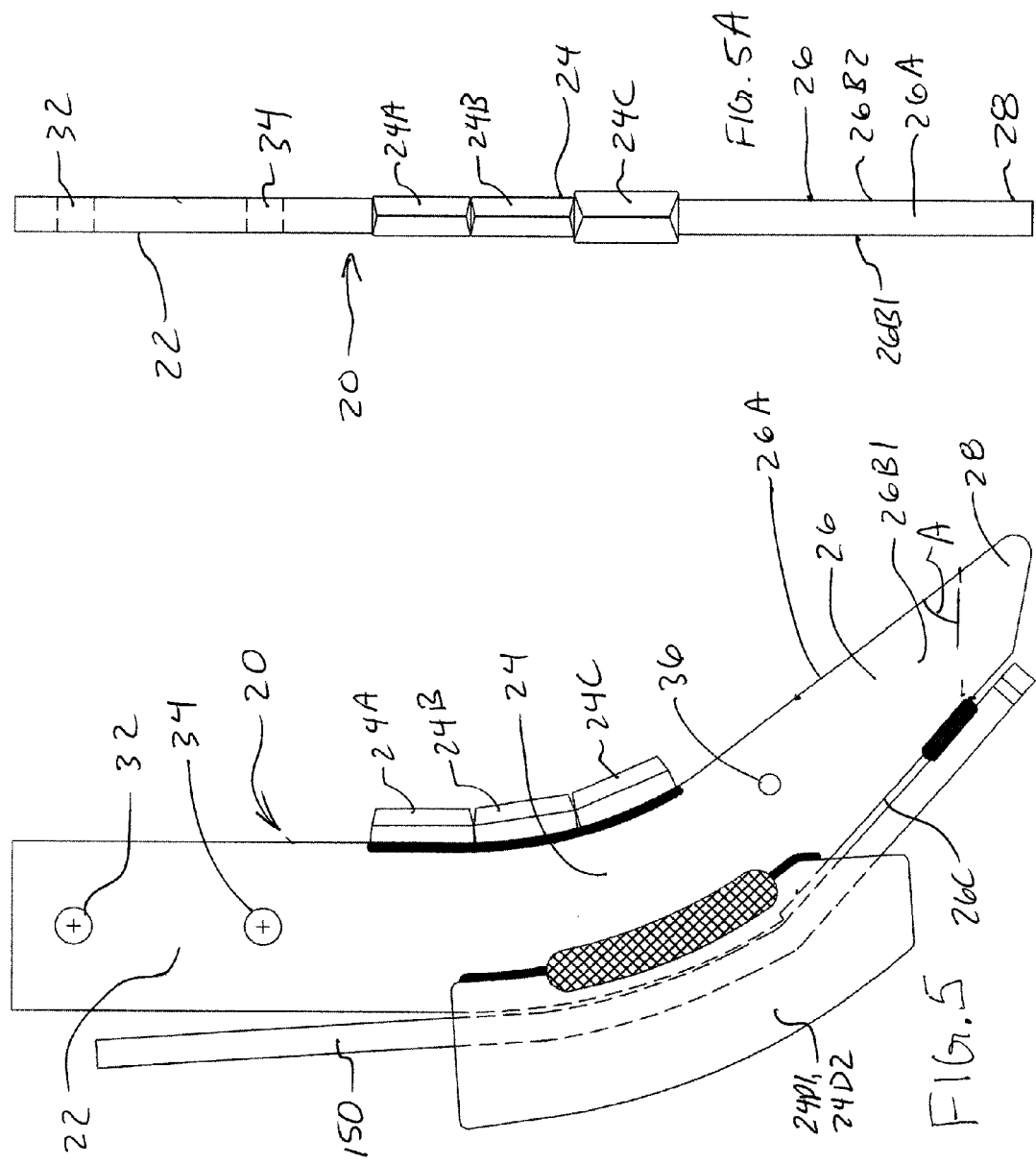

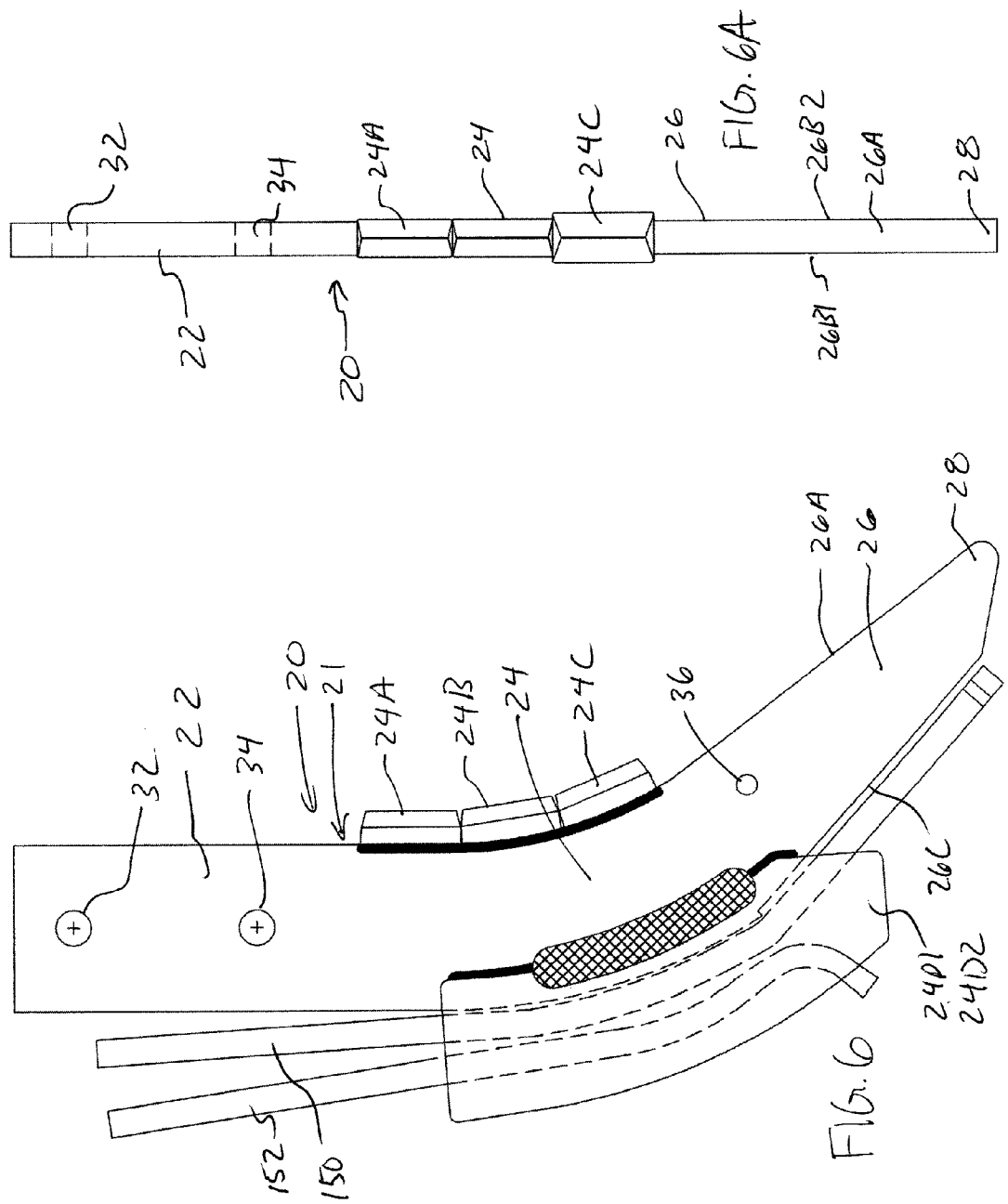

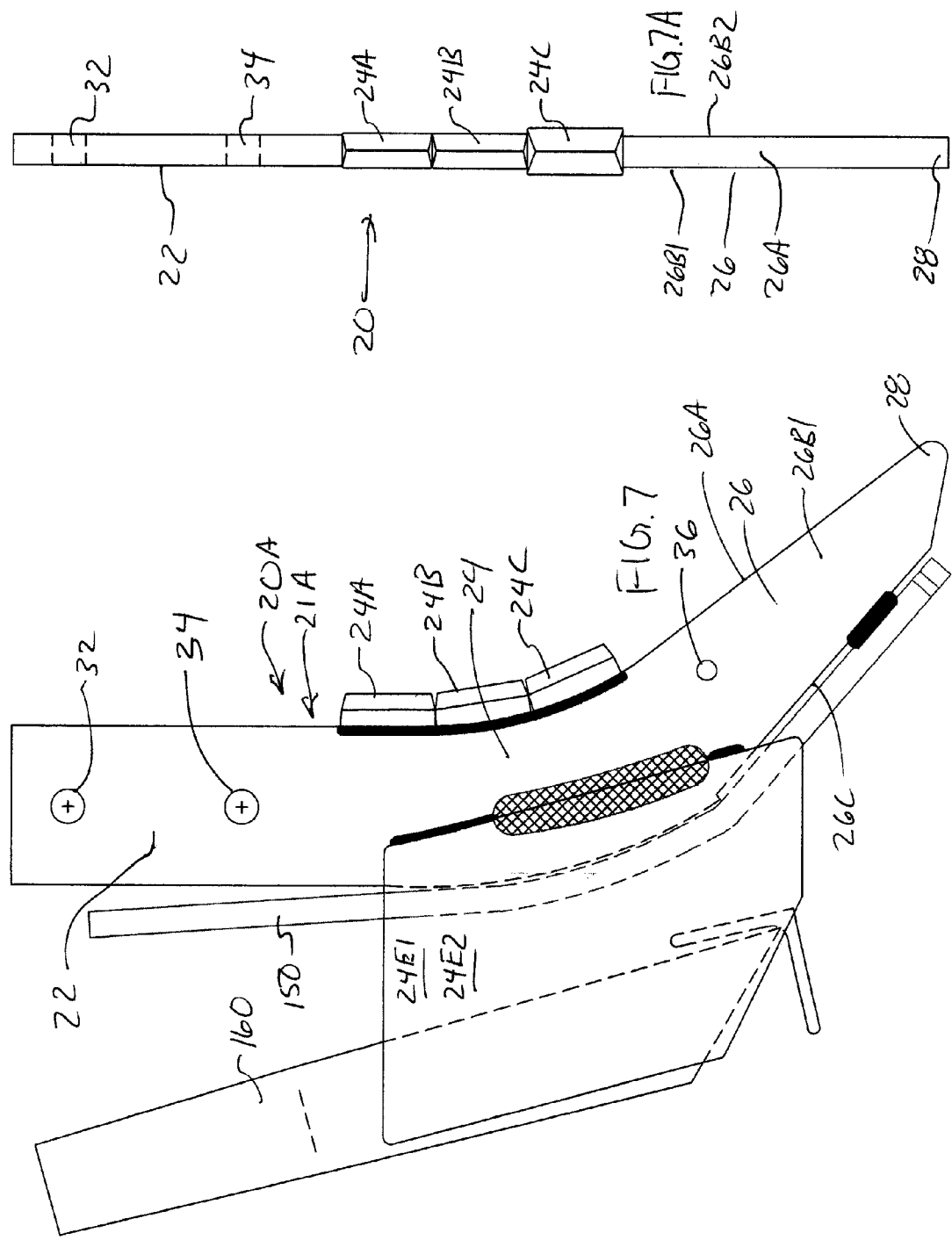

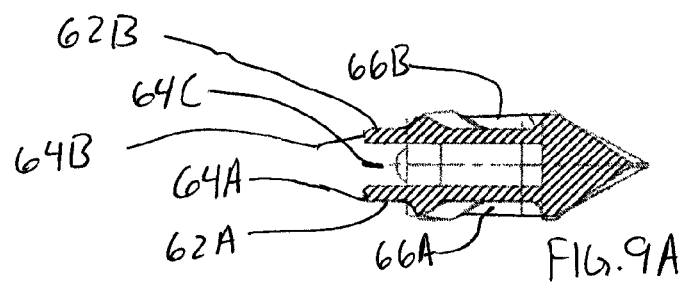
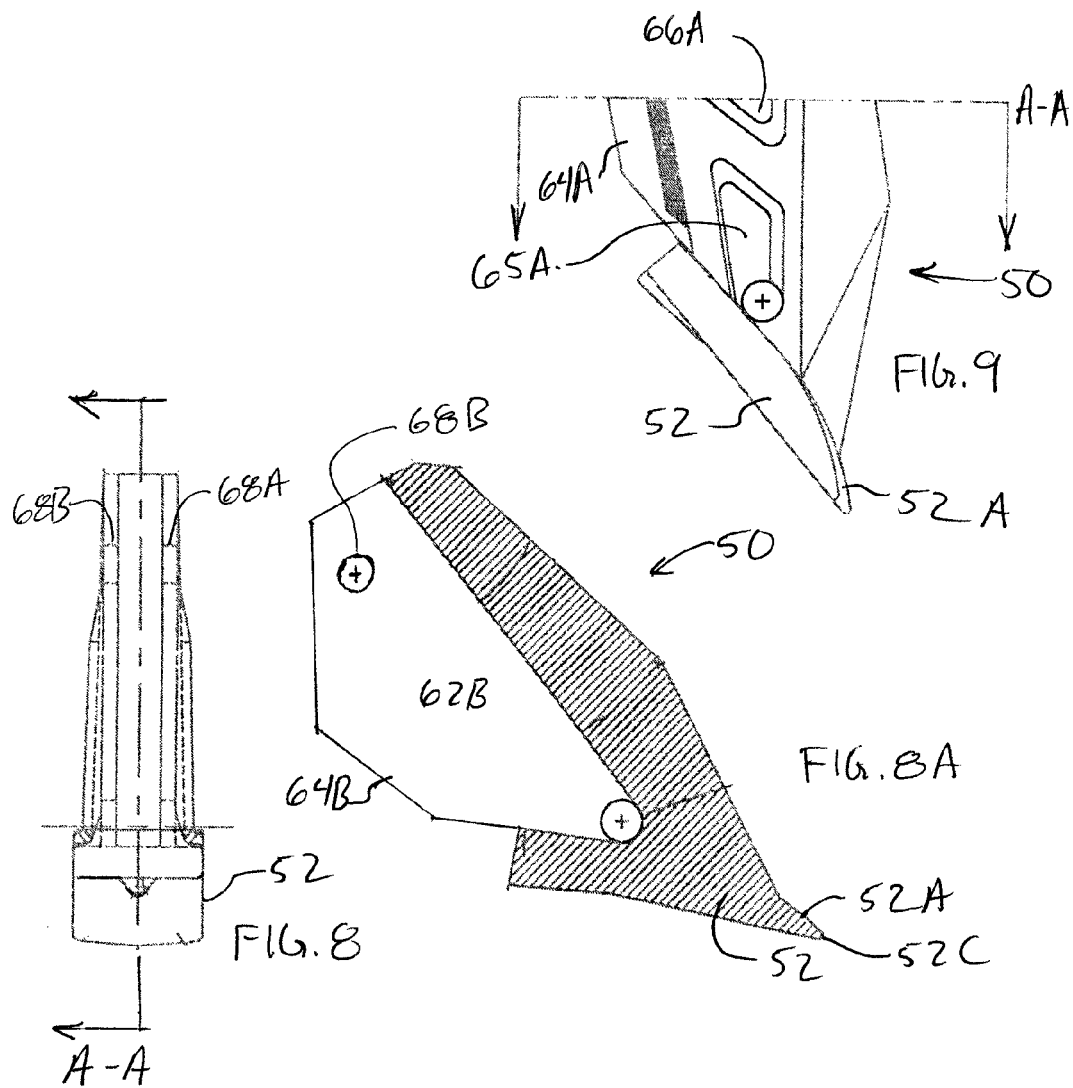

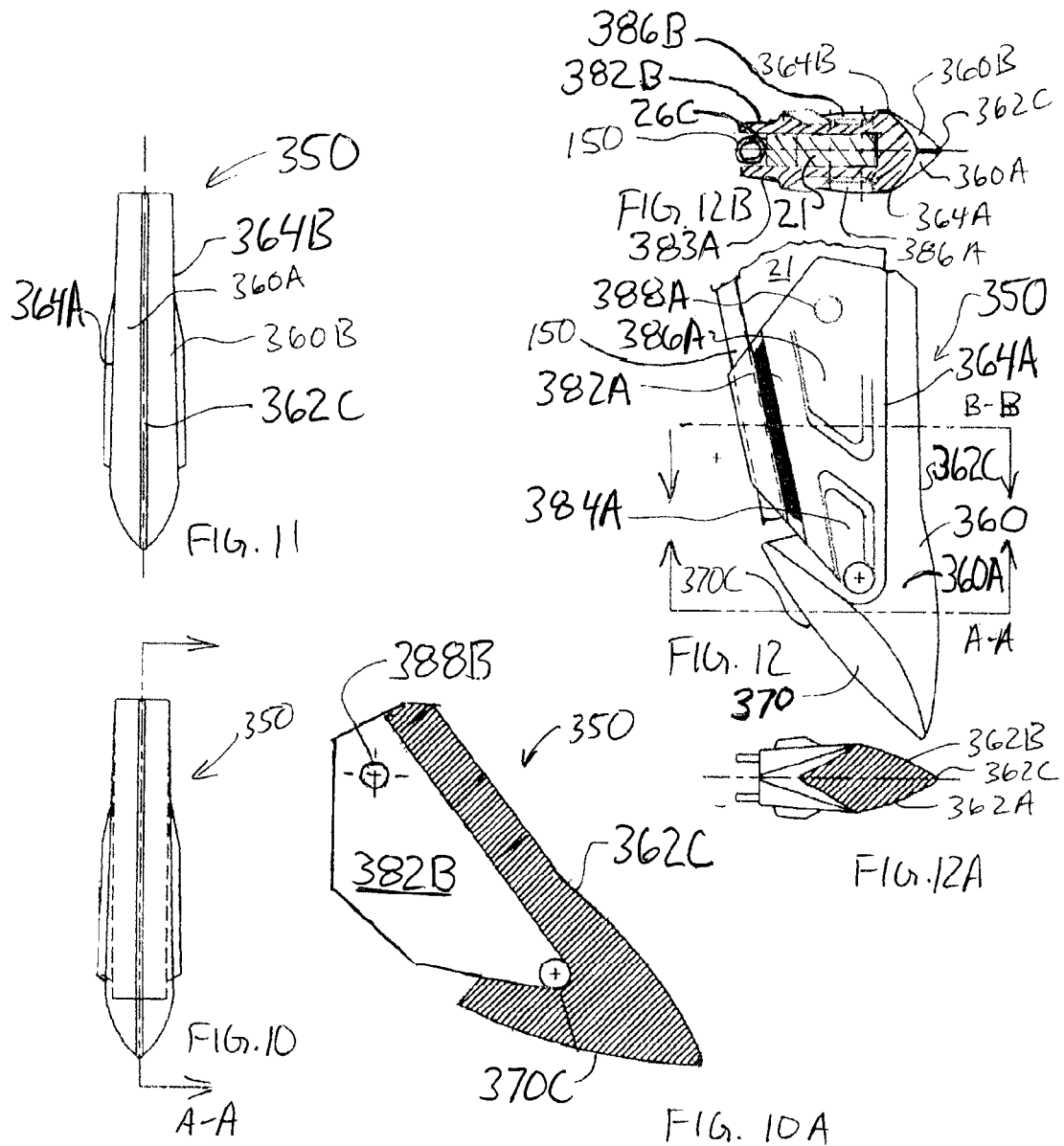

SIDE MOUNTED FERTILIZER KNIFE ASSEMBLY WITH INTERCHANGEABLE STRIP TILL AND LOW DRAFT POINTS

CROSS REFERENCES TO RELATED APPLICATIONS

This application claims the benefit of U.S. Provisional Patent Application Ser. No. 61/440,114 filed on Feb. 7, 2011 which is incorporated herein by reference.

FIELD

This invention relates to an improved fertilizer applicator assembly used to apply fertilizer beneath the soil surface, and more particularly, to an improved applicator knife assembly which releases a stream of fluid fertilizer, such as anhydrous ammonia, at the bottom of a furrow which is formed by the passage of the applicator knife assembly through the soil.

BACKGROUND

Fertilizer blade assemblies are employed by farmers to deliver nitrogen enriching fertilizers such as anhydrous ammonia to a targeted zone beneath the surface of the soil of a crop field while causing a minimum of disruption to the structure of the upper layer of the topsoil while causing significant disruption of the soil within two or three inches of the lower soil working portion of the blade assembly. Fertilizer blade assemblies are used by farmers who are practicing "strip-till" cultivation. Strip-till cultivation is a method of farming in which the disturbance of the soil at the surface is minimized. Strip-till cultivation usually creates a strip of dark soil at the surface typically between 2 and 10 inches in width where a fertilizer knife passes through the surface. Thus the term "strip-till". This darker strip of soil will also warm faster in the spring which is beneficial for germination and growth. By preserving most of the structure of the upper layer of topsoil, farmers can protect the moisture retaining capacity of the soil and also make it easier for new crop plants to put down roots. Typically, fertilizer implements carry patterns of fertilizer blade assemblies spaced for simultaneously delivering fertilizer to a plurality of parallel furrows. The placement and control of such fertilizer blades is conducted with extreme precision—typically on the order of +/− one inch. This is made possible with Global Positioning System (GPS) technology in combination with local transmitter devices that allow the farmer to control implement location with such precision. Thus, for example, the farmer is able to apply precisely targeted fertilizer and then return at a later time to plant seeds in strips of soil that exactly corresponds to the strips of soil that received fertilizer.

Typical prior art fertilizer applicator blades are one-piece structures having a shank member with a blade portion. The shank member is typically an elongated steel plate which, when in use, slants down and forward into the soil and is usually bolted to one of a plurality of the machine shanks of a fertilizer implement. A typical prior art blade portion is either integral with the shank plate or permanently welded to the shank plate and provides a hard sharp leading edge. A fertilizer tube is also welded to the trailing edge of the shank plate. With a typical prior art fertilizer blade, the fertilizer tube is welded to the back of the blade's shank member and the fertilizer tube terminates at the base of the shank member and delivers liquid fertilizer to the furrowed soil at that location as the blade assembly cuts through the soil. With prior art fertilizer applicator blades, when part of the fertilizer applicator blade is too worn for use, the entire blade is removed and replaced.

Single piece fertilizer applicator blades have another important disadvantage. In many cases farmers will need to perform a strip-till operation in a first field, such as a cornfield, and then will need to perform a low-draft till operation in a second field, such as a soybean field. In order to transfer a fertilizing rig from the first field to the second field, a farmer must remove all of the strip-till blade assemblies from the machine and replace them with low-draft blade assemblies. Typically, these machines carry as many as 16 fertilizer knife assemblies, and, for each fertilizer knife, the farmer must unclamp and disconnect the fertilizer tube, remove the bolts securing the knife shank to the machine shank and do much of this work in an area that is obstructed by other components of the machine. Typically, such a change might require as much as three hours for a 16 blade rig. The delay involved in changing blade assemblies represents a significant cost. But, such a delay is particularly troublesome if the farmer is attempting to complete an operation in a field prior to the onset of bad weather.

Present fertilizer blade assemblies have yet another disadvantage. The fertilizer tube mounted on the back surface of the knife shank is typically exposed to the passage of soil that eventually wears and destroys the fertilizer tube.

Accordingly, what is needed is a fertilizer blade assembly having a blade shank that is adapted to receive points that can be removed and replaced and further to receive a strip-till point adapted for strip-till operations between 6 and 12 inches below the surface and a low-draft point adapted for operations in a zone between 4 and 7 inches below the surface. Further, it would be advantageous if the shanks and points included additional side flanges that extend on both sides of the fertilizer tube running down the back edge of the knife shank thereby enclosing and protecting the fertilizer tube from wear thereby prolonging the life of the fertilizer tube.

SUMMARY

The above described needs are addressed by an improved side mounted fertilizer blade assembly for injecting fertilizer fluid under the surface agricultural topsoil. The improved side mounted fertilizer blade assembly includes a knife shank, a fertilizer tube and a point member which is interchangeable with at least one other point member.

The knife shank is a side mounted knife shank having a proximate end adapted for side mounting to a machine shank of a fertilizer implement and a distal end adapted for receiving a removable point member. The knife shank includes an upper portion and a lower portion. The upper portion of the knife shank is generally upright and has a generally constant cross section. The lower portion of the knife shank extends down and forward from the upper portion and is tapered toward its distal end. The upper portion and the lower portion of the knife shank each have a front surface, two parallel side surfaces and a back surface. The knife shank is preferably fashioned from strong, tough heat treated spring steel that is adapted for sustaining repeated cyclic loads and significant bending stresses.

The point member is adapted for removably attaching to the lower portion of the knife shank. The point member includes a forward leading edge portion, a base portion and opposite flank portions that connect between the leading edge portion and the base portion. The leading edge portion, the base portion and the flank portions define a channel for receiving the lower portion of the knife shank. The point member also has a fastener hole that is positioned to align with a fastener hole in the shank member. The aligned fastener holes in the shank member and the point member receive a fastener for releasably securing the point member to the knife shank. The point member includes a leading edge portion having surfaces that converge to define cutting surfaces operable for breaking apart soil as the point passes through the soil. The point member may be a strip-till point member having planar forward surfaces adapted for maximizing the disruption of the subsoil. A strip-till point member is appropriate for use in strip-till cultivation at depths generally between six and twelve inches below the soil surface. In the alternative, point member may be a low-draft point member having forward surfaces that are smooth and contoured. Such forward surfaces of a low-draft point member are adapted for minimizing the disruption of the subsoil. A low-draft point member is indicated for low-draft till cultivation at depths generally between four and seven inches below the soil surface. While the point member may experience compression and even some tension while in operation, the point member does not transfer large bending loads or tension loads to the knife shank. However, the point member is subjected to very large amounts of abrasion as it passes through the soil. Accordingly, the point member is preferably fashioned from hard cast iron such as, for example, ASTM A532 cast iron.

The point member, whether it is a strip-till point member or a low-draft point member, includes two opposite flank portions extending behind the forward surfaces of the point member. The flank portions have side surfaces that are generally parallel to and closely spaced away from the side surfaces of the knife shank. Pockets defined in the outside surfaces of the flank portions promote soil disruption as soil passes over the flanks. Each flank portion originates at a forward boundary at one of the cutting surfaces of the leading edge portion and terminates at a rear boundary that defines rear perimeter of the flank portion. The rear perimeters of the flank portions extend from the proximate end of the point member to the distal end of the point member and also extend past the rear surface of the lower portion of the shank member. Accordingly, the flank portions of the point and the rear surface of the lower portion of the shank member define a tube channel suitable for receiving and protecting a fertilizer tube.

The fertilizer tube is mounted behind the knife shank and extends to the distal end of the knife shank. The fertilizer tube has at least one opening at its distal end for releasing fertilizer fluid. The fertilizer tube is mounted to the shank member such that it is received by and protected the tube channel defined by the rear surface of the lower portion of the knife shank and the flank portions of the point member.

BRIEF DESCRIPTION OF THE DRAWINGS

FIG. 1 is a side view of the fertilizer blade assembly side mounted to a machine shank of a fertilizer implement shown in a working position penetrating the soil surface with a strip-till point member.

FIG. 1A is a side view of the fertilizer blade assembly side mounted to a machine shank of a fertilizer implement shown in a working position penetrating the soil surface with a low-draft till point member.

FIG. 2 is a side view of the fertilizer blade assembly shown with a strip-till point.

FIG. 3 is a front view of a fertilizer blade assembly shown with a strip-till point.

FIG. 4 is side view of a strip-till point.

FIG. 5 is a side view of the knife shank shown without a point member mounted to the knife shank.

FIG. 5A is a front view of the knife shank shown in FIG. 5.

FIG. 6 is a side view of the knife shank shown without a point member mounted to the knife shank and shown with a secondary fertilizer tube.

FIG. 6A is a front view of the knife shank shown in FIG. 6.

FIG. 7 is a side view of the knife shank shown without a point member mounted to the knife shank and shown with a secondary fertilizer tube for applying dry, particulate fertilizer.

FIG. 7A is a front view of the knife shank shown in FIG. 7.

FIG. 8 is a rear view of a strip-till point member.

FIG. 8A is a sectioned view of the point member shown in FIG. 8 taken from plane A-A indicated in FIG. 8.

FIG. 9 is a partial side view of a strip-till point member.

FIG. 9A is a sectioned view of the strip-till point member shown in FIG. 9 taken from plane A-A indicated in FIG. 9.

FIG. 10 is a front view of a low-draft point member.

FIG. 10A is a sectioned view of the low-draft point member shown in FIG. 10 taken from plane A-A indicated in FIG. 10.

FIG. 11 is a front view of a low-draft point member of FIG. 10 with the hidden lines of FIG. 10 removed for clarity.

FIG. 12 is a side view of a low-draft point member.

FIG. 12A is a sectioned view of the low-draft point member shown in FIG. 12 taken from plane A-A indicated in FIG. 12.

FIG. 12B is a sectioned view of the low-draft point member shown in FIG. 12 taken from plane B-B indicated in FIG. 12.

DETAILED DESCRIPTION

Referring to the drawings, FIG. 1 shows an improved fertilizer blade assembly 10 connected to a machine shank 5 of a fertilizer implement (not shown). As can be seen in FIG. 1 fertilizer blade assembly 10 includes a knife shank assembly 20 and a strip-till point member 50. It should be understood that machine shank 5 is only one of a pattern of machine shanks spaced to correspond with crop rows which are carried by the fertilizer implement (not shown). In FIG. 1, fertilizer blade assembly 10 is shown in a working position in relation to the surface of soil 6 which is represented by a horizontal line. Fertilizer blade assembly 10, when in operation, moves in a horizontal direction as indicated by direction arrow D from left to right when viewed from the perspective of FIG. 1. A second fertilizer blade assembly 310 is shown in FIG. 1A. Fertilizer blade assembly 310 is identical to blade assembly 10 except for having a low-draft point member 350 (which is intended for low-draft cultivation) instead of a strip-till point member 50. As can be seen in FIG. 1A, the placement of surface of soil 6A shows that low-draft point member 350 passes through the soil at a shallower depth when compared to the deeper depth for strip-till point member 50 shown in FIG. 1.

Strip-till blade assembly 10 and low-draft blade assembly 310 are intended for use for applying subsoil fertilizers, such as, for example, anhydrous ammonia. Strip-till blade assembly 10 is further intended to deposit such a fertilizer in a zone beneath surface 6 shown in FIG. 1 in the context of strip-till cultivation. Strip-till cultivation is most often conducted in connection with the cultivation of corn which generally requires the distribution of nitrogen fixing liquid fertilizer in a highly disrupted zone of soil generally between six and twelve inches below the surface. In contrast, low-draft blade assembly 310 is equipped with alternate low-draft point member 350. Low-draft blade assembly 310 is adapted to deposit a fertilizer in a zone beneath surface 6A shown in FIG. 1A in connection with low-draft cultivation. Low-draft cultivation is conducted, for example, to cultivate soybeans, which require the deposition of a liquid fertilizer in a zone of soil that is shallower and typically less disrupted than is the case for strip-till cultivation. As can be seen by comparing FIGS. 1 and 1A, when an operator wishes to convert his or her fertilizer implement from a strip-till configuration as shown in FIG. 1 to a low-draft configuration as shown in FIG. 1A, the operator merely needs to remove point members 50 from shank assemblies 20, replace them with point members 350, and adjust the draft depth from generally that shown in FIG. 1 to that shown in FIG. 1A. Performing a reverse operation will convert the implement back to the strip-till configuration shown in FIG. 1.

The purpose of knife shank assembly 20 is to carry point member 50 (or point member 350 shown in FIG. 1A) as point member 50 (or point member 350) is drafted through the soil and to carry a fertilizer tube 150 which is operable for conveying liquid fertilizer to a location at the bottom of a furrow that is cut by point member 50. Accordingly, shank assembly 20 transfers the loads resulting from drafting point member 50 through soil 1A to machine shank 5. Shank assembly 20 further includes a shank member 21, fertilizer tube 150, soil guards 24A, 24B and 24C and soil guard plates 24D1 and 24D2. Fertilizer tube 150 may be welded to the back surface of shank member 21 as shown in FIGS. 1, 1A, 2 and 5 or may be otherwise attached to the back surface of shank member 21. To function properly, shank member 21 should be fashioned from a strong, tough material such as heat treated spring steel.

As can be best seen in FIG. 5, shank member 20, which is a solid, continuous piece, includes an upper portion 22, a bend portion 24, a lower portion 26 and a toe portion 28. As is shown in FIG. 5, upper portion 22 is generally upright and includes two attachment holes 32 and 34 for receiving fasteners for attaching shank member 20 to machine shank 5 as shown in FIGS. 1 and 1A. Upper portion 22 has a generally constant rectangular cross section. Bend portion 24 is curved and may have a generally constant rectangular cross section.

As can be seen in FIG. 5, bend portion 24 is curved and connects between upper portion 22 and lower portion 26. In this example, the lower end of the forward surface of upper portion 22 and the forward surface of bend portion 24 includes soil guards 24A, 24B and 24C. Soil guards 24A, 24B and 24C are preferably fashioned from a hard material such as cast iron, and are preferably welded to the forward surface of upper portion 22 and the forward surface of bend portion 24. Also in this example, a pair of soil guard plates 24D1 and 24D2 are welded to the opposite side surfaces of bend portion 24 adjacent to the back edges of the side surfaces of bend portion 24. Soil guard plates 24D1 and 24D2 extend back from the back edges of bend portion 24 to provide a protected channel for fertilizer tube 150. Soil guard plates 24D1 and 24D2 may be fashioned from a hard material such as wear resistant steel plate.

As is shown in FIG. 5, lower portion 26 extends down and forward from bend portion 24 at an angle A as shown in FIG. 5. Lower portion 26 includes a front surface 26A, two side surfaces 26B1 and 26B2 and a back surface 26C. The angle A of front surface 26A, in this example, is approximately between 50 and 60 degrees in relation to the horizontal and is preferably approximately 55 degrees in relation to the horizontal. Lower portion 26 also includes a fastener hole 36 near its upper end that is adapted to receive a pin 70 (shown in FIGS. 2 and 2A) for mounting a point member. As can be seen in FIG. 5, lower portion 26 does not have a constant cross section, rather, lower portion 26 is tapered from its proximate end where its width corresponds to upper portion 22 and bend portion 24 to its distal end where it is considerably narrower and where it connects with toe portion 28. The forward and outside surfaces of lower portion 26, namely forward surface 26A, side surfaces 26B1 and 26B2 and rear surface 26C and the outside surfaces of toe portion 28 are arranged to correspond with and fit the inside surfaces of at least two types of point members, namely, at least strip-till point member 50 and low-draft point member 350 which will be described in greater detail below.

FIGS. 6 and 7 provide side views of two other alternate configurations for knife shank assembly 21. In FIG. 6, knife shank assembly 21 includes a second fertilizer tube 152 that is located behind fertilizer tube 150. In FIG. 7, knife shank assembly 21A includes much larger side plates 24E1 and 24E2, which support and protect an optional second fertilizer tube 160 for transferring dry material into the furrow created by the knife assembly.

Strip-till point member 50 may be best understood by referring to FIGS. 2, 3, 4, 8, 8A, 9 and 9A. FIG. 2 provides a side view of knife assembly 10 with strip-till point 50 attached in place by a pin 70. FIG. 3 provides a front view of this arrangement. FIG. 4 provides a side view of strip-till point 50 shown in isolation. The purpose of strip-till point member 50 is to shatter and crumble the soil in a zone in a layer of soil that is generally between 6 and 12 inches below the surface and thereby leave in its wake a subsurface strip of disrupted, crumbled soil that is approximately two or three inches wide and between 6 and 12 inches below the surface. This strip of disrupted soil captures and substantially seals in fertilizer that is released at the lower back end of fertilizer knife assembly 10 through the distal end of fertilizer tube 150. Most of the abrading contact between the soil and fertilizer knife assembly 10 occurs between the soil and the outside surfaces of point member 50. Point member 50 transfers compressive forces to shank member 21 but is not subject to bending forces, as is the case with shank member 21. Accordingly, point member 50, as noted above, is preferably fashioned from a hard material, such as cast iron, which may be brittle and lack toughness when compared to the material of shank member 21.

As can be seen in FIG. 4, point member 50 is a one piece casting which includes a base portion 52, two side flank portions 62A (opposite side flank portion not shown but symmetrically identical to flank portion 62A) and a forward portion 54. Base portion 52 is located at the lower end of point member 50. As shown in FIG. 3, base portion 52 presents a leading lift surface 52A that presents a bottom cutting edge 52C which is generally horizontal. Leading lift surface 52A slopes upwardly from its bottom cutting edge 52C and is shaped to encounter soil and lift the soil as point member 50 passes through the soil. Forward portion 54 is faceted with a first pair and a second pair of generally planar soil breaking surfaces that meet to define forward cutting edges. The first pair of soil breaking surfaces, 56A and 56B, have forward edges that meet to define a lower forward cutting edge 56C which extends immediately up from lift surface 52A. First soil breaking surfaces 56A and 56B also define opposite aft edges 56A1 and 56B1. As shown in FIG. 3, the second pair of soil breaking surfaces 58A and 58B extend between aft edges 56A1 and 56B1 of first opposed diverging soil breaking surfaces 56A and 56B and their aft edges 58D1 and 58D2 which also define the forward edges of flank portions 62A and 62B. Second soil breaking surfaces 58A and 58B meet to define an upper forward cutting edge 58C that extends up from the upper end of lower forward cutting edge 56C.

Side flank portions 62A and 62B of point member 50 are designed to facilitate the disruption of soil passing over point member 50 and to further protect fertilizer tube 50 from the abrasive effects of the passage of that soil. As can be best seen in FIGS. 9 and 9A, flank portion 62A on the right side of point member 50 extends back from edge 58D1 and includes a lower pocket 65A and an upper pocket 66A. Similarly, flank portion 62B on the right side of point member 50 includes a lower pocket (not shown), which is identical and opposite to right side lower pocket 65A and an upper pocket 66B. Further, flank portions 62A and 62B extend back to aft edges 64A and 64B which, as can be seen in FIG. 2, extend sufficiently to provide a protective channel 64C (shown in FIG. 9A) for protecting the lower end of fertilizer tube 150. Flank portions 62A and 62B also include two co-axial bores 68A and 68B near the upper end of flank portions 62A and 62B that are adapted to receive a pin 70 (shown in FIG. 2) for mounting strip-till point member 50 to shank member 22. As can be seen from the above description, strip-till point 50 is adapted to sustain considerable wear and abrasion, is configured to shatter and break soil for strip-till cultivation and includes flank portions that extend sufficiently to protect the lower portion of fertilizer tube 150.

FIGS. 10, 10A, 11, 12, 12A and 12B provide detailed illustrations of a low-draft point member 350. Low-draft point member 350 is designed to be interchangeable with strip-till point member 50 described above. Generally, low-draft point member includes a base portion 370, a forward portion 360 and two opposite flank portions 382A and 382B. Base portion 370 and forward portion 360 have smooth, contoured surfaces. Base portion 370 includes two generally symmetrical contoured surfaces that converge at the center line of point member 350 to define a lower curved edge 370C. Similarly, forward portion 360 includes a pair of opposite forward contoured surfaces 360A and 360B that meet to define a forward cutting edge 362C. As can be best seen in FIG. 12, the upper portion of forward cutting edge 362C is generally straight while the lower portion of forward cutting edge 362C is generally curved. As can be seen in FIGS. 11, 12 and 12B, forward contoured surfaces 360A and 360B have trailing edges 364A and 364B that define the forward edges of right and left flank portions 382A and 382B. As is shown in FIGS. 12 and 12B, right flank portion 382A includes a lower pocket 384A and an upper pocket 386A. The opposite left flank portion 382B also includes a lower pocket that is not shown and an upper pocket 386B that is shown in FIG. 12B. As is the case with pockets 66A and 66B in flank portions 62A and 62B of strip-till point member 50, the pockets in the left and right flank portions of low-draft point member 350 cause the breaking and shattering of soil as it passes over the sides of low-draft point member 350.

As can be seen in FIGS. 12 and 12B, low-draft point member 350 is also mounted to shank member 21 in the same way strip-till point member 50 is shown to be mounted to shank member 21 in FIG. 2. Accordingly, a pin such as pin 70 shown in FIGS. 2 and 2A passes through coaxial holes 388A and 388B in flank portions 382A and 382B respectively of low-draft point member 350 as well as fastener hole 36 of shank member 22 shown in FIG. 5. As described above, pin 70 is removable so that low-draft point member 350 may be removed and replaced with another point member.

As can also be seen in FIGS. 12 and 12B, flank portions 382A and 382B extend sufficiently beyond the back surface 26C of shank member 21 to define a channel for receiving fertilizer tube 150. Thus the lower end of fertilizer tube 150 is protected by flank portions 382A and 382B from the passage of soil.

As can be understood from the above description, either strip-till point member 50 or low-draft point member 350 may be removed and replaced when either type of point member is excessively worn or when it is desirable to change from one type of point member to another type of point member. This capability to remove and replace point members and to change the type of point member allows the farmer to alternate between different modes of cultivation and to continue using most of the components of set of knife blade assemblies with a minimum amount of down time and disruption. These capabilities result in significant gains in productivity.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A side mounted fertilizer blade assembly for injecting fertilizer fluid under the surface agricultural topsoil, comprising:

(a) an elongated side mounted shank member having a proximate end adapted for side mount attachment to a machine shank of a fertilizer implement, the shank member having an upper portion and a lower portion, the upper portion being generally upright and having a generally constant cross section, the lower portion extending down and forward from the upper portion and being tapered toward the distal end thereof, the upper portion and the lower portion each having a front surface, two parallel side surfaces and a back surface, the shank member also having at least one fastener hole, (b) a point member adapted for attachment to the lower portion of the shank member and adapted for drafting through soil beneath a soil surface, the point member including a forward leading edge portion, a base portion and opposite flank portions that connect between the leading edge portion and the base portion, the leading edge portion, the base portion and the flank portions defining a channel for receiving the lower portion of the shank member, the point member having at least one fastener hole that is positioned to align with the at least one fastener hole in the shank member for receiving at least one fastener for removably fastening the point member to the shank member, the leading edge portion of the point member defining cutting surfaces operable for breaking apart soil as the point passes through the soil, (c) each flank portion of the point member having generally flat side surfaces that are generally parallel to and closely spaced away from the side surfaces of the shank member and which each originate at a forward boundary and terminate at a rear boundary that defines rear perimeter which extends from the proximate end of the point member to the distal end of the point member and that extend past the rear surface of the lower portion of the shank member such that the flank portions and the rear surface of the lower portion of the shank member define a tube channel, the flank portions also presenting pockets that cause soil to shatter and break apart as the soil passes over the flank portions, (d) a pair of soil guard plates affixed to the opposite side surfaces of the shank member above the point member, the soil guard plates extending behind the back surface of the shank member thereby defining a protected channel behind the back surface of the shank member, (e) a fertilizer tube mounted behind the shank member and extending to the distal end of the shank member, the fertilizer tube having at least one opening at the distal end thereof for releasing fertilizer fluid, the fertilizer tube mounted to the shank member such that the fertilizer tube is received by the protected channel defined by the soil guard plates and the shank member and the tube channel of the point member, the protected channel defined by the soil guard plates and the shank member and the tube channel of the point member extending sufficiently such that at least most of the portion of the fertilizer tube which is beneath the soil surface is protected from the abrasive action of passing soil as the blade assembly is drafted through the soil.

2. A side mounted fertilizer blade assembly, comprising:
(a) an elongated side mounted shank member having a proximate end adapted for side mount attachment to the shank of a fertilizer implement, the shank member having a generally rectangular cross section and having an upper portion and a lower portion, the upper portion being generally upright and having a generally constant cross section, the lower portion extending down and forward from the upper portion and being tapered toward the distal end thereof, the upper portion and the lower portion each having a front surface, two parallel side surfaces and a back surface, the lower portion having a fastener hole extending between the side surfaces thereof, the shank member presenting at least on fastener hole,
(b) a fertilizer tube fixed to the back surface of the shank member, the fertilizer tube for conveying liquid fertilizer from the fertilizer implement into the soil,
(c) at least two interchangeable point members adapted for attachment to the lower portion of the shank member and adapted for drafting through soil beneath a soil surface, the point members each including a forward leading edge portion, a base portion and opposite flank portions that connect between the leading edge portion and the base portion, the leading edge portion, the base portion and the flank portions defining a channel for receiving the lower portion of the shank member, each of the point members having at least one fastener hole that is positioned to align with the at least one fastener hole in the shank member for receiving at least one fastener for removably fastening each point member to the shank member, the leading edge portion of each point member defining cutting surfaces operable for breaking apart soil as the point passes through the soil, the flank portions extending behind the back surface of the shank member to define a tube channel for receiving the fertilizer tube,
(d) a pair of soil guard plates fixed to the opposite side surfaces of the shank member above the point member, the soil guard plates extending behind the back surface of the shank member thereby defining a protected channel behind the back surface of the shank member for receiving the fertilizer tube, the protected channel defined by the soil guard plates and the tube channel defined by the point member extending sufficiently such that at least most of the fertilizer tube which is adjacent to the shank member and beneath the soil surface is protected from the abrasive action of passing soil as the blade assembly is drafted through the soil.

3. The fertilizer blade assembly of claim 2, wherein;
the interchangeable point members include a strip-till point member adapted for operations such that the distal end of the point member is generally between six and twelve inches below the surface of the soil, the strip-till point member having planar forward surfaces adapted for maximizing the disruption of the subsoil.

\* \* \* \* \*